(«[54]») United States Patent [19]

Ishihara

[11] Patent Number: 5,044,415
[45] Date of Patent: Sep. 3, 1991

[54] AUTOMOBILE TIRE CHAIN HAVING WING-SHAPED MOUNTING MEMBERS HINGEABLY ATTACHED TO ANTI-SLIDING MEMBERS

[76] Inventor: Shigeru Ishihara, 13-5, Kamodahonmachi, Okazaki-shi, Ichigen, Japan

[21] Appl. No.: 368,793

[22] Filed: Jun. 20, 1989

[30] Foreign Application Priority Data

Jun. 22, 1988 [JP] Japan .................................. 63-152137

[51] Int. Cl.⁵ ...................... B60C 27/20; B60C 27/10
[52] U.S. Cl. .................................... 152/228; 152/179;
152/185.1; 152/225 R; 305/15; 305/19
[58] Field of Search ...................... 152/179, 182, 185.1,
152/187, 188, 189, 191, 208, 213 R, 213 A, 216,
225, 226, 227, 228, 232, 223, 224, 221, 222, 171,
172, 175; 180/9.28; 238/14; 305/19, 40, 35 R,
36, 39, 15

[56] References Cited

U.S. PATENT DOCUMENTS 2,653,642 9/1953 Cella ................................. 152/225 R
4,813,466 3/1989 Forsyth ............................... 152/220

FOREIGN PATENT DOCUMENTS 1062870 9/1952 France ............................. 152/225 C Primary Examiner—Michael W. Ball
Assistant Examiner—Gregory J. Wilber
Attorney, Agent, or Firm—Sterne, Kessler, Goldstein & Fox

[57] ABSTRACT

A tire chain which has a plurality of anti-sliding members, each of which is attached to a base plate and a pivot pin. Wing-shaped members are hingeably attached to the bases and the pivot pins are connected by chain links to form an endless linkage.

10 Claims, 3 Drawing Sheets

AUTOMOBILE TIRE CHAIN HAVING WING-SHAPED MOUNTING MEMBERS HINGEABLY ATTACHED TO ANTI-SLIDING MEMBERS

FIELD OF THE INVENTION

The present invention relates to an automobile tire chain and specifically to an automobile tire chain mounted on the tire when the automobile runs on snow road, iced road, sand field, slough and etc.

PRIOR ART OF THE INVENTION

In connection with the above kind of prior tire chain as a snow chain, there are many kinds of tire chain including the steel chain type, the rubber net type and etc. However, every one of the various kinds of the tire chain mentioned above has such a problem that it is difficult to mount it on the tire. Also, in case of the rubber made tire chain, the quick start or stop of the automobile should be avoided.

In order to remove the various problems mentioned above, the purpose of the present invention is to provide an automobile tire chain which is easy to be mounted or removed but yet by women and it can be maintained under not only the running condition of the automobile but also the quick start and stop condition of the automobile.

SUMMARY OF THE INVENTION

In order to achieve the purpose of the present invention, the automobile tire chain comprises a pivot pin connecting with the chain links, an anti-sliding member having its base portion welded to the pivot pin, a wing shaped member having a flat plate and a curved plate, a hinge having an inner plate from which the flat plate of the wing shaped member is free and an outer plate secured on the outer face of the curved plate of the wing shaped member and a bar shaped base integrated with the anti-sliding member having a tooth portion extruded from the pivot pin and integrated with the inner plate of the hinge. The outer plates of the hinges are located on the opposite to each other at the outward sides of the bar shaped base. When the tooth portion of the anti-sliding member is directed downward and the bar shaped base is located at a horizontal plane and the wing shaped member is under the free condition, the moment created by the weight of the curved plate and the outer plate in the direction that the opening angle of the outer plate is increased at the center of the pin shaft of the hinge is larger than the moment created by the weight of the flat plate in the direction that the opening angle of the outer plate is decreased so the flat plate is raised upward from the upper face of the bar shaped base.

In accordance with the present invention, when the tire chain is mounted on the front wheel of the automobile, the tire chain is laid longitudinally just before to the front wheel and by way of driving the automobile forward, the front wheel treads on the flat plate of the wing shaped member which is raised upward from the upper face of the bar shaped base. The wing shaped member is rotated at the center of the pin shaft of the hinge so that the curved plate becomes to press against the outer flank side of the tire on the front wheel.

In the result that the next curved plate presses against the outer flank side of the tire sequently, if the front wheel has been rotated with one turn, the mounting of the curved plate has been done at the same pitch around the tire. In order to make an endless tire chain, the ends of the first link and the last link are coupled by the bolt so the mounting of the tire chain is done. In removing the tire chain from the tire, the bolt is released and by way of driving the automobile backward, the tire chain remains forward to the wheel of the automobile. Also, in mounting the tire chain on the back wheel, the tire chain is laid longitudinally just back to the back wheel and by way of driving the automobile backward, if the back wheel has been rotated with one turn, the mounting of the curved plate has been done at the same pitch around the tire as described above. In order to make an endless tire chain, the links are coupled by the bolt so the mounting of the tire chain is done. In removing the tire chain from the tire, the bolt is released and by way of driving the automobile forward, the tire chain remains backward to the back wheel.

DETAILED DESCRIPTION OF THE PREFERRED EMBODIMENT

Figure 1:
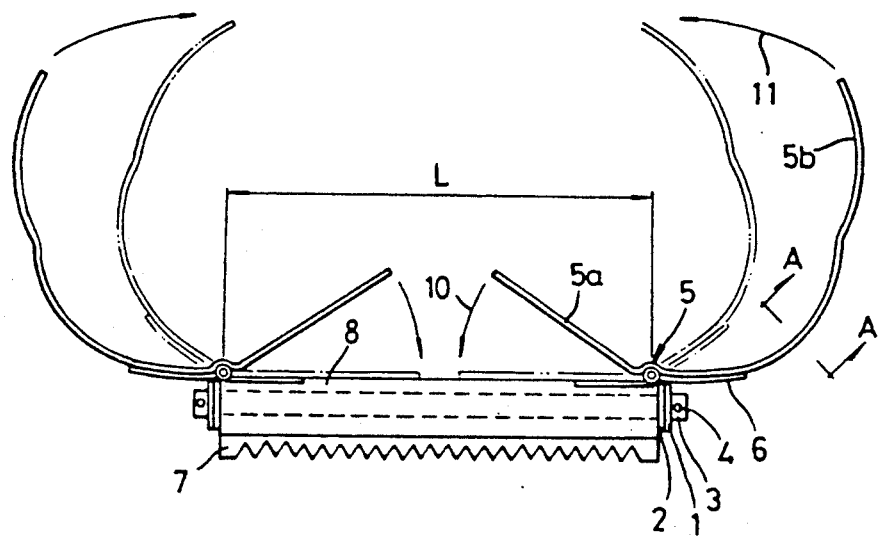
FIG. 1 is a front view of the preferred embodiment of the present invention.
Figure 2:
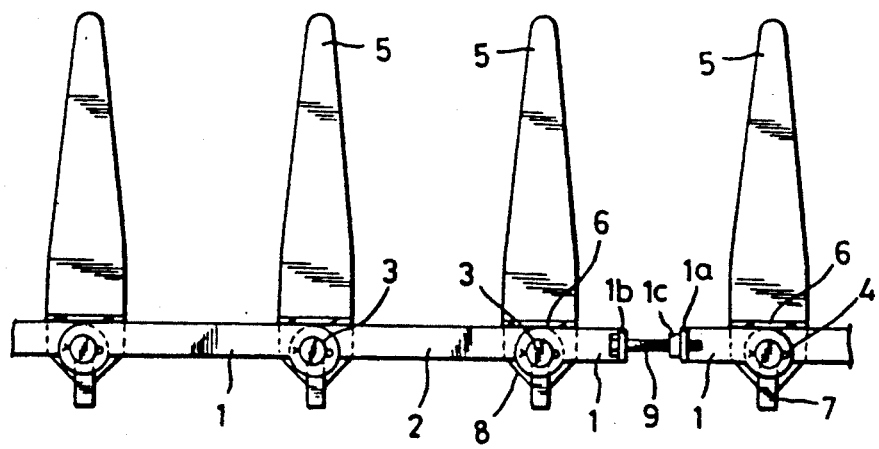
FIG. 2 is a side view of the preferred embodiment of the present invention.

Referring to FIGS. 1 and 2, an outer chain link made of steel is indicated as numeral 1 and an inner chain link made of steel is indicated as numeral 2. Also, a steel pivot pin connecting the outer link 1 with the inner link 2 is indicated as numeral 3 and a pin inserted into the pivot pin 3 in order to prevent the links 1 and 2 from being removed from the pivot pin 3 is indicated as numeral 4.

Numeral 5 indicates a wing shaped member made of steel and numeral 6 indicates a steel hinge. Also, numeral 7 indicates an anti-sliding member made of steel and numeral 8 indicates a bar shaped base made by a die casting.

Figure 4:
FIG. 4 is a sectinal view taken along with line A—A of FIG. 1 showing the section of the curved plate of the wing shaped member which can be closed to the outer flank side of the tire.
Figure 5:
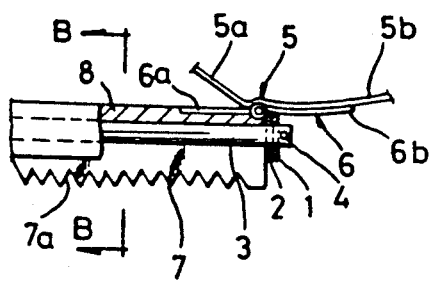
FIG. 5 is a partial front view of the preferred embodiment of the present invention with cut-away portions.
Figure 6:
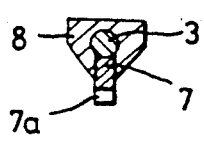
FIG. 6 is a sectional view taken along with line B—B of FIG. 5.
Figure 7:
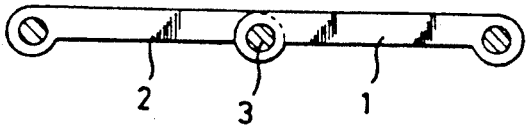
FIG. 7 is a side view of the chain linkage of the present invention.

The anti-sliding member 7 has a thermally treated tooth portion 7a as shown in FIGS. 5 and 6 and its base portion is welded to the pivot pin 3. The wing shaped member 5 consists of a flat plate 5a on which the tire rests and a curved plate 5b which can be closed to the outer flank side of the tire as shown in FIGS. 1 and 5. The section of the curved plate 5b has a slightly inside bent shape as shown in FIG. 4.

Figure 8:
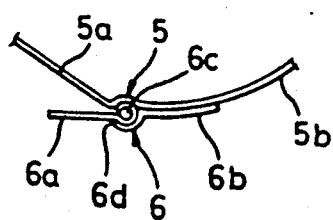
FIG. 8 is a front view showing the condition of the maximum opening of the hinge.
Figure 9:
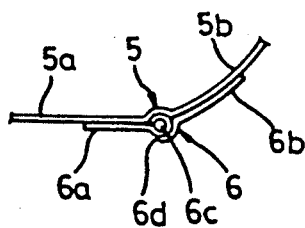
FIG. 9 is a front view showing the condition of the minimum opening of the hinge.

The hinge 6 has an inner plate 6a and an outer plate 6b as shown in FIGS. 8 and 9. The inner plate 6a is free from the flat plate 5a of the wing shaped member 5 whereas the outer plate 6b is riveted on the outer face of the curved plate 5b of the wing shaped member 5. At the center of a pin shaft 6c, the opening angle of the outer plate 6b to the inner plate 6a is maximum under the condition as shown in FIG. 8 (In FIGS. 5, 8 and 9, there is a respective clockwise rotating opening of the hinge.), i.e., when the outer plate 6b is rotated clockwise at the center of the pin shaft 6c, a rolled portion 6d of the outer plate 6b is abutted with the portions of the lower face of the inner plate 6a so the rolled portion acts as a stopper and the inner plate cannot be rotated clockwise further.

When the outer plate 6b is rotated counter-clockwise at the center of the pin shaft 6c as shown in FIG. 9, the rolled end 6d disengages from the portions of the lower face of the inner plate 6a so the outer plate can be rotated counter-clockwise until the flat plate 5a of the wing shaped member is abutted with the upper face of the inner plate 6a.

The bar shaped base 8 is cast integrally with the anti-sliding member 7 and the pivot pin 3 so that the tooth portion 7a of the anti-sliding member is extruded from the bar shaped base 8 as shown in FIGS. 5 and 6 and also it is cast integrally with the inner plate 6a of the hinge 6 as shown in FIG. 5.

Figure 3:
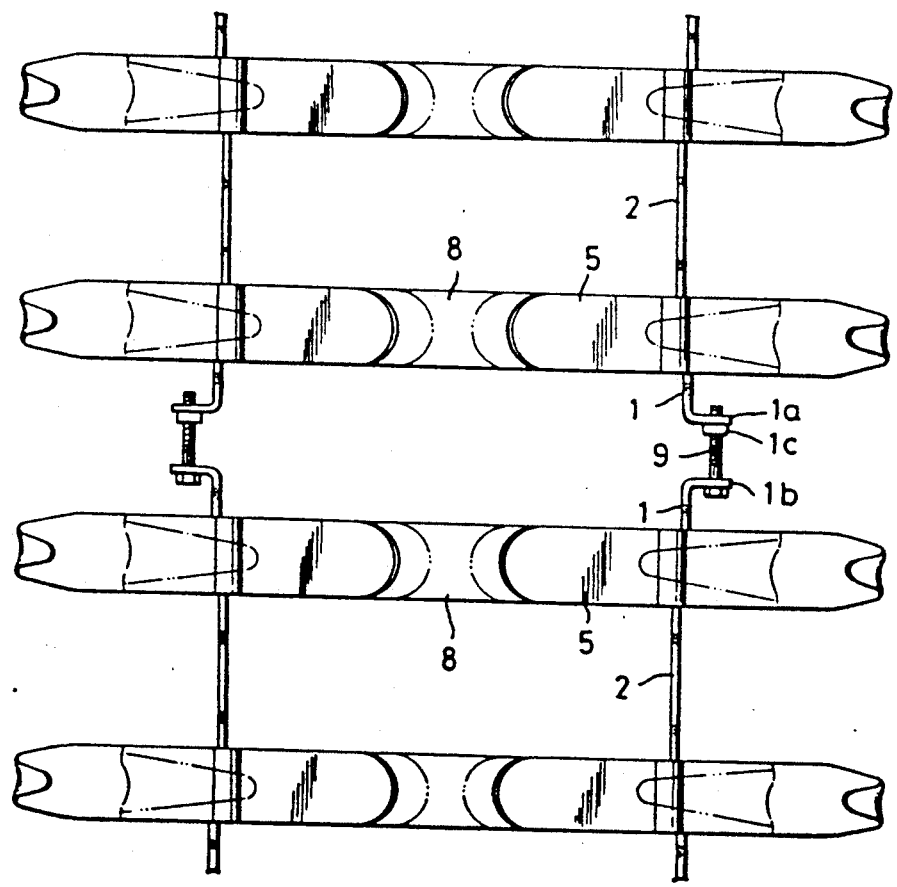
FIG. 3 is a plan view of the preferred embodiment of the present invention.

Numeral 9 as indicated in FIGS. 2 and 3 is a bolt for connecting one bent end 1a of one chain link 1 with other bent end 1b of other link 1 so as to construct an endless chain linkage and a nut member 1c is welded to the bent end 1a and there is a hole at the bent end 1b.

When the tooth portion 7a of the anti-sliding member 7 is directed downward as shown in FIG. 1 and the bar shaped base 8 is located at a horizontal plane and the wing shaped member 5 is under the free condition, the moment created by the weight of the curved plate 5b and the outer plate 6b in the direction that the opening angle of the outer plate 6b is increased at the center of the pin shaft 6c(Refer to FIG. 8.) of the hinge 6 is larger than the moment created by the weight of the flat plate 5a in the direction that the opening angle of the outer plate 6b is decreased so the flat plate 5a is raised upward from the upper face of the bar shaped base 8. Under the above condition, the wing shaped member is indicated by a solid line in FIG. 1. The distance between the upper end of one curved plate 5b and the upper end of the other curved plate 5 located on the opposite sides of the bar shaped base 8 is longer than the width of the tire.

When the tread portion of the tire is located on the flat plates 5a of the opposite sides wing shaped member 5 so both flat plate 5a are rotated inwardly as indicated by an arrow 10, each of the curved plates 5b integrated with each of the flat plates is inclined inwardly as indicated by an arrow 11 so that the curved plate 5b presses against the outer flank side of the tire under the condition as indicated by a broken line.

The length of the curved plate 5b is determined so that it doesn't contact with the wheel of the automobile when the curved plate 5b presses against the outer flank side face of the tire. Also, it is preferred that the moment mentioned above created by the flat plate 5a is balanced with that created by the curved plate 5b in the condition as indicated by a solid line in FIG. 1.

In mounting the automobile tire chain constructed as shown on the front wheel of the automobile, the tire chain is laid longitudinally just before the front wheel, i.e., it is located at the automobile's forward direction in the shape of tape. Thereafter, by way of driving the automobile forward, the front wheel treads on the flat plate 5a of the wing shaped member which is raised upward from the upper face of the bar shaped base 8 and the wing shaped member 5 is rotated at the center of the pin shaft 6c of the hinge 6 so that its flat plate 5a becomes to contact with the bar shaped base 8 and its curved plate 5b becomes to press against the outer flank side of the tire on the front wheel.

In the result that the next curved plate presses against the outer flank side of the tire sequently as the same as above in accordance with the advance of the front wheel, if the front wheel has been rotated with one turn, the mounting of the curved plate has been done at the same pitch around the tire. In order to make an endless tire chain, the bent ends 1a and 1b are coupled by the bolt 9 so the mounting of the tire chain is done.

In removing the tire chain from the tire, the bolt 9 is released and by way of driving the automobile backward, the tire chain remains before the wheel of the automobile.

In mounting the tire chain on the back wheel, the tire chain is laid longitudinally just back the back wheel and by way of driving the automobile backward, if the back wheel has been rotated with one turn, the mounting of the curved plate 5b has been done at the same pitch around the tire as described above in case of the front wheel. In order to make an endless tire chain, the links are coupled by the bolt 9 so the mounting of the tire chain is done.

In removing the tire chain from the tire, the bolt 9 is released and by way of driving the automobile forward, the tire chain remains back the back wheel.

From the mentioned above, it is understood that it is merely easy to mount and remove the tire chain on and from the tire and the tire chain is such mounted that the flat plate 5a and the bar shaped base 8 can press against the tread portion of the tire and the curved plate 5b can be attached closely to the outer flank side of the tire so that the anti-sliding member 7 can provide a preferred anti-sliding effect and has no restriction at the quick start or stop condition.

Also, since there are many size of tire, the distance L between the pin shaft on the opposite sides of the bar shaped base as shown in FIG. 1 needs to be determoned at a desire and in case of the double wheel such as a back wheel of the cargo truck, the distance L needs to be longer than twice of that for the single wheel described above.

As described above, the present invention comprises a pivot pin connecting with the chain links, an anti-sliding member having its base portion welded to the pivot pin, a wing shaped member having a flat plate and a curved plate, a hinge having an inner plate from which the flat plate of the wing shaped member is free and an outer plate secured on the outer face of the curved plate of the wing shaped member and a bar shaped base integrated with the anti-sliding member and the inner plate of the hinge.

Also, in accordance with the present invention, when the tooth portion of the anti-sliding member is directed downward and the bar shaped base 8 is located at a horizontal plane, the flat plate of the wing shaped member is raised upward from the upper face of the bar shaped base and since the curved plate of the wing shaped member is opened outwardly, if the tire chain is mounted on the front wheel of the automobile, the tire chain is laid just before the front wheel and the automobile is drived forward. If the tire chain is mounted on the back wheel of the automobile, it is laid just back the back wheel and the automobile is drived backward.

Thereafter, the mounting of the tire chain is done by way of coupling the bent ends of the chain links through the bolt so as to make an endless tire chain. In removing the tire chain, the procedures are done vice versa so it is very easy to mount and remove the tire chain. Also, the mounted tire chain is attached closely to the tire so the effectiveness of the anti-sliding is remarkable and there is no restriction at the quick start or stop condition.

What is claimed is:

1. A tire chain comprising:
   a plurality of anti-sliding members, each of which is attached to corresponding base plates and pivot pins;
   a plurality of wing-shaped members, each of which is hingeably attached to said base plates; and
   a plurality of substantially parallel chain links connecting parallel ends of said pivot pins.

2. A tire chain according to claim 1, further comprising means for connecting said parallel chain links to form and endless chain linkage.

3. A tire chain according to claim 2 wherein said connecting means comprises two halves of a chain link, each half having a bent end with a hole for receiving a bolt.

4. A tire chain according to claim 1 wherein each of said wing-shaped members further comprises:
   a flat plate extending over said base plate;
   a curved plate with at least a portion near said base plate extending away from said base plate;
   wherein said flat and curved plates are joined together at a hinge.

5. A tire chain according to claim 4 wherein said flat and said curved plates are balanced so that a moment created about the hinge by the weight of the curved plate is greater than a moment created by the weight of flat plate.

6. A tire chain according the claim 4 wherein rolling a tire over said base plates causes both flat and curved plates to rotate about said hinge until the flat plate contacts the base plate and the curved plate presses against an outer flank of the tire.

7. A tire chain for a vehicle tire comprising:
   a plurality of anti-sliding members, each of which is attached to corresponding base plates and pivot pins;
   a plurality of wing-shaped members, each of which is hingably attached to said base plates;
   each of said wing-shaped members further comprising:
   a flat plate extending over said base plate;
   a curved plate with at least a portion near said base plate extending away from said base plate;
   a plurality of substantially parallel chain links connecting parallel ends of said pivot pins;
   means for connecting said parallel chain links to form an endless chain linkage;
   wherein said flat and curved plates are joined at a hinge in such a way that rolling a tire over said base plates causes both flat and curved plates to rotate about said hinge until the flat plate contacts the base plate and the curved plate presses against an outer flank of the tire.

8. A tire chain according to claim 7 wherein said connecting means comprises two halves of a chain link, each half having a bent end with a hole for receiving a bolt which may be tightened with a nut.

9. A tire chain according to claim 7 wherein said flat and said curved plates are balanced so that a moment created about the hinge by the weight of the curved plate is greater than a moment created by the flat plate.

10. An automobile tire chain for a vehicle tire comprising:
    a pivot pin connecting with two chain links;
    an anti-sliding member having its base portion welded to the pivot pin;
    at least two wing-shaped members having a flat plate and a curved plate;
    at least two hinges having an inner plate to which the flat plate of the wing-shaped member is not secured and an outer plate secured on the outer face of the curved plate of the wing-shaped member; and
    a bar-shaped base integrated with the anti-sliding member on a first surface and the inner plate of the hinges on a second surface;
    wherein the outer plates of the hinges are mirror images to each other and extended past extremities of the bar-shaped base, and when the tooth portion of the anti-sliding member is directed downward and the bar-shaped base is located at a horizontal plane with respect to the ground and the wing-shaped members are under a free condition to move freely since a tire is not mounted between the wing members;
    a moment created by the weight of the curved plate and the outer plate, in a direction where an opening angle of the hinge with respect to the outer plate is increased at the center of the pin shaft of the hinge, is larger than the moment created by the weight of the flat plate, in a direction where the opening angle of the hinge with respect to the outer plate is decreased so that the flat plate is raised upward from the second face of the bar-shaped base.

* * * * *